US009075746B2

(12) United States Patent
Hyuseinova et al.

(10) Patent No.: US 9,075,746 B2
(45) Date of Patent: Jul. 7, 2015

(54) UTILITY AND LIFETIME BASED CACHE REPLACEMENT POLICY

(75) Inventors: Nevin Hyuseinova, Barcelona (ES); Qiong Cai, Barcelona (ES); Serkan Ozdemir, Barcelona (ES); Ayose J. Falcon, L'Hospitalet de Llobregat (ES)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 13/992,240

(22) PCT Filed: Dec. 23, 2011

(86) PCT No.: PCT/US2011/067213

§ 371 (c)(1), (2), (4) Date: Jun. 6, 2013

(87) PCT Pub. No.: WO2013/095639

PCT Pub. Date: Jun. 27, 2013

(65) Prior Publication Data

US 2014/0089595 A1 Mar. 27, 2014

(51) Int. Cl.

*G06F 12/12* (2006.01)
*G06F 12/08* (2006.01)
*G06F 13/16* (2006.01)

(52) U.S. Cl.

CPC ............ *G06F 12/121* (2013.01); *G06F 12/127* (2013.01); *G06F 12/12* (2013.01); *G06F 12/08* (2013.01); *G06F 13/16* (2013.01); (Continued)

(58) Field of Classification Search

CPC ............................... G06F 12/12; G06F 12/127
USPC .................................................. 711/133, 134
See application file for complete search history.

(56) References Cited

U.S. PATENT DOCUMENTS

| | | | | |
|---|---|---|---|---|
| 6,272,598 | B1 * | 8/2001 | Arlitt et al. | 711/133 |
| 6,425,057 | B1 * | 7/2002 | Cherkasova et al. | 711/134 |
| 2003/0061469 | A1 | 3/2003 | Solomon et al. | |

(Continued)

FOREIGN PATENT DOCUMENTS

| | | |
|---|---|---|
| KR | 10/0383407 | 5/2003 |
| KR | 10/0496159 | 6/2005 |

OTHER PUBLICATIONS

PCT International Search Report for PCT Counterpart Application No. PCT/US2011/067213, 3 pgs., (Sep. 24, 2012).

(Continued)

*Primary Examiner* — Than Nguyen
(74) *Attorney, Agent, or Firm* — Nicholson De Vos Webster & Elliott LLP

(57) ABSTRACT

Embodiments of the invention describe an apparatus, system and method for utilizing a utility and lifetime based cached replacement policy as described herein. For processors having one or more processor cores and a cache memory accessible via the processor core(s), embodiments of the invention describe a cache controller to determine, for a plurality of cache blocks in the cache memory, an estimated utility and lifetime of the contents of each cache block, the utility of a cache block to indicate a likelihood of use its contents, the lifetime of a cache block to indicate a duration of use of its contents. Upon receiving a cache access request resulting in a cache miss, said cache controller may select one of the cache blocks to be replaced based, at least in part, on one of the estimated utility or estimated lifetime of the cache block.

21 Claims, 13 Drawing Sheets

(52) U.S. Cl.
CPC .......... *G06F12/0897* (2013.01); *G06F 12/123* (2013.01); *G06F 12/0811* (2013.01)

(56) References Cited

U.S. PATENT DOCUMENTS

| | | | | |
|---|---|---|---|---|
| 2004/0083341 | A1 | 4/2004 | Robinson et al. | |
| 2005/0097085 | A1 * | 5/2005 | Shen et al. | 707/3 |
| 2014/0089559 | A1 * | 3/2014 | Cai et al. | 711/102 |
| 2014/0281249 | A1 * | 9/2014 | Waldspurger et al. | 711/129 |

OTHER PUBLICATIONS

PCT Written Opinion of the International Searching Authority for PCT Counterpart Application No. PCT/US2011/067213, 4 pgs., (Sep. 24, 2012).

PCT Notification concerning Transmittal of International Preliminary Report on Patentability (Chapter I of the Patent Cooperation Treaty) for PCT Counterpart Application No. PCT/US2011/067213, 6 pgs., (Jul. 3, 2014).

* cited by examiner

UTILITY AND LIFETIME BASED CACHE REPLACEMENT POLICY

CROSS-REFERENCE TO RELATED APPLICATION

This patent application is a U.S. National Phase Application under 35 U.S.C. §371 of International Application No. PCT/US2011/067213, filed Dec. 23, 2011, entitled UTILITY AND LIFETIME BASED CACHE REPLACEMENT POLICY.

FIELD

Embodiments of the invention generally pertain to computing devices and more particularly to utility and lifetime based cache replacement policies.

BACKGROUND

Cache memory may be utilized by processors or processing cores for fast access of contents stored in (slower) system main memory. Caches may be hierarchically organized into multiple levels, e.g., include a Level 1 cache (L1), Level 2 cache (L2) and so on. Typically, in a multi-level cache environment, all the data stored in a low level cache is also present in a higher level cache. For example, all data in the (low level) L1 caches are present in the (higher level) L2 cache that the L1s share.

Advances in memory device technology have allowed for increasingly large caches to be used for higher level caches. If efficiently exploited, a large cache may be of utmost importance by significantly reducing the miss rates and on-chip/off-chip bandwidth requirements, in turn improving overall system performance and cost.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system and method for utility and lifetime based cache replacement policies are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Embodiments of the invention describe an apparatus, system and method for utilizing a utility and lifetime based cached replacement policy as described herein. For processors having one or more processor cores and a cache memory accessible via the processor core(s), embodiments of the invention describe a cache controller to determine, for a plurality of cache blocks in the cache memory, an estimated utility and lifetime of the contents of each cache block, the utility of a cache block to indicate a likelihood of use of its contents, the lifetime of a cache block to indicate a duration of use of its contents. Upon receiving a cache access request resulting in a cache miss, said cache controller may select one of the cache blocks to be replaced based, at least in part, on one of the estimated utility or estimated lifetime of the cache block.

Figure 1:
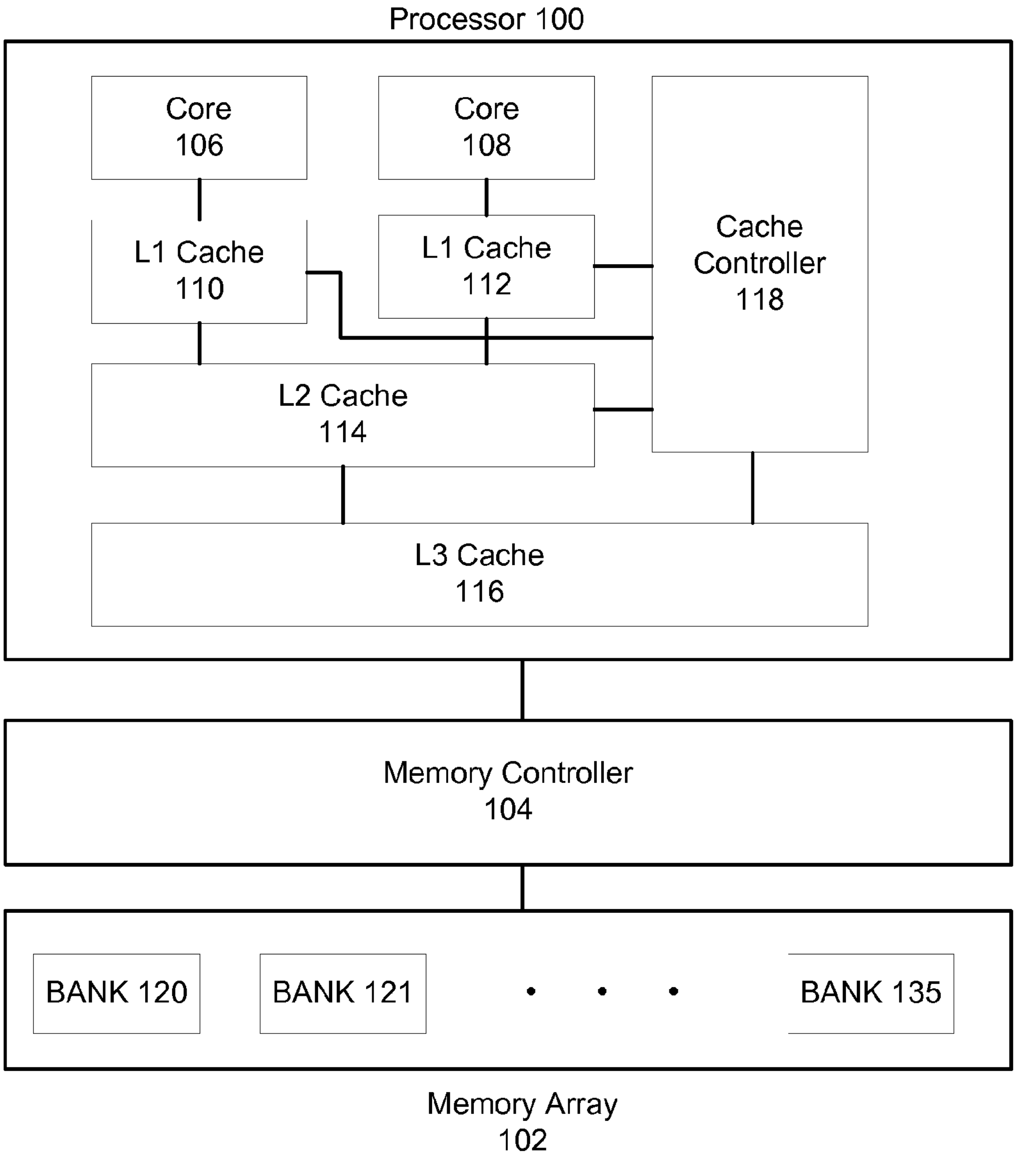
FIG. 1 illustrates a block diagram of a system processor and memory for utilizing an embodiment of the invention.

FIG. 1 illustrates a block diagram of a system processor and memory for utilizing an embodiment of the invention. In this embodiment, processor 100 is shown to be communicatively coupled to system memory array 102 via memory controller 104. Said system memory may comprise multiple memory banks (shown as banks 120, 121 . . . 135).

Processor 100 as illustrated includes processing cores 106 and 108, each core having a dedicated lower level (i.e., L1) cache. Processing core 106 is shown to utilize L1 cache 110, while processing core 108 is shown to utilize cache 112. The contents of each lower level cache are based on the data requests of applications executed by each respective processing core.

Processor 100 is shown to include L2 cache 114 and L3 cache 116. In this embodiment, L2 cache includes data contained in both L1 caches 110 and 112, and L3 cache further includes recently evicted data. As L2 cache and L3 cache are not directly accessed by cores 106 and 108, said caches may herein be referred to as upper/higher level caches.

Processor 100 is shown to further include cache controller 118. Said cache controller is responsible for cache coherency and cache content replacement policies according to embodiments of the invention.

Conventional cache content replacement policies such as Least Recently Used (LRU) policies track the usage of cache blocks in the cache since the time the block is brought into cache memory. Said policies evict blocks based on the observed usage. For example, LRU evicts the least recently used block.

For embodiments utilizing large upper level caches, such replacement policies may not be ideal, as all usages may not be tracked at the higher level caches (i.e., lower level caches may receive multiple requests for content that higher level caches are not aware of).

Embodiments of the invention utilize a cache block replacement policy that captures the global picture of blocks' behavior by determining information about each block's usefulness and lifetime. Then, at the time blocks are brought into the cache (or a specified level of cache), they are categorized based on their utility and lifetime expectation. The cache content replacement policy according to embodiments of the invention considers this lifetime and utility categorization when searching for a victim to evict in response to a cache memory miss.

Figure 2:
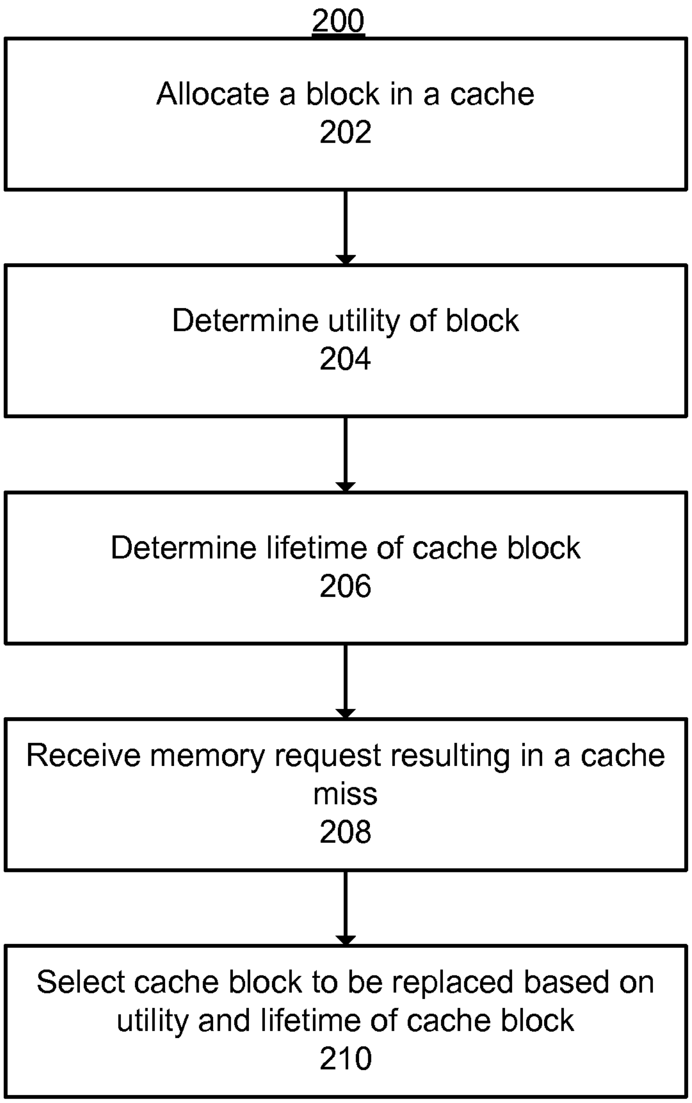
FIG. 2 is a flow chart describing a process for selecting a memory address mapping scheme according to an embodiment of the invention.

FIG. 2 is a flow chart describing a process for selecting a memory address mapping scheme according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 200 describes operations for executing a cache block replacement policy utilizing two concepts in any combination: utility and lifetime of cache blocks. As described herein, the "utility" of a cache block is a measure of how useful a cache block is; the "lifetime" of a cache block is a measure of how long the block maintains its usefulness. For example, a block may be very useful for a short or a long duration, a block can be of little use for a very short time, etc.

At the time a block is allocated in a cache, 202, said block's utility may be estimated, 204. In some embodiments, a "victimization-to-use" measurement is used as an indicator for usefulness/utility of a cache block. Said utility measurement may be a specific value, or one of a finite number of categories.

If a block is used shortly after it has been victimized (i.e., if a block with new contents is used again), then the block is categorized to be relatively more useful; if a block is not used shortly after it has been victimized—i.e., the block has a long victimization-to-use time, then the block is categorized to be relatively less useful. In some embodiments, in order to account for the past history of the block, the actual utility category of a block is estimated as a function of the block's last utility category and the most recent victimization-to-use time as described below.

Said block's lifetime may be also be estimated at the time the block is allocated in the cache, 206. Said lifetime measurement may be a specific value, or one of a finite number of lifetime categories. In one embodiment, the lifetime category of a block is determined as a function of the previous lifetime category the page was in and the previous and new utility levels of the block.

In response to receiving a cache access request resulting in a cache miss, 208, one of the cache blocks is selected to be replaced, 210. The selection of the block to be replaced is based, at least in part, on one of the determined (i.e., estimated) utility or estimated lifetime of the cache block.

Thus, in the embodiments of the invention described above, cache blocks are categorized based on utility and lifetime estimations (i.e., predictions) at the time they are allocated in the cache. The executed cache replacement policy victimizes blocks on category priorities. Note that the replacement policy does not need to track the detailed usage of a block while it is in cache. This is particularly useful for higher level caches that do not see the complete usage of blocks because the low level caches filter the requests.

Figure 3:
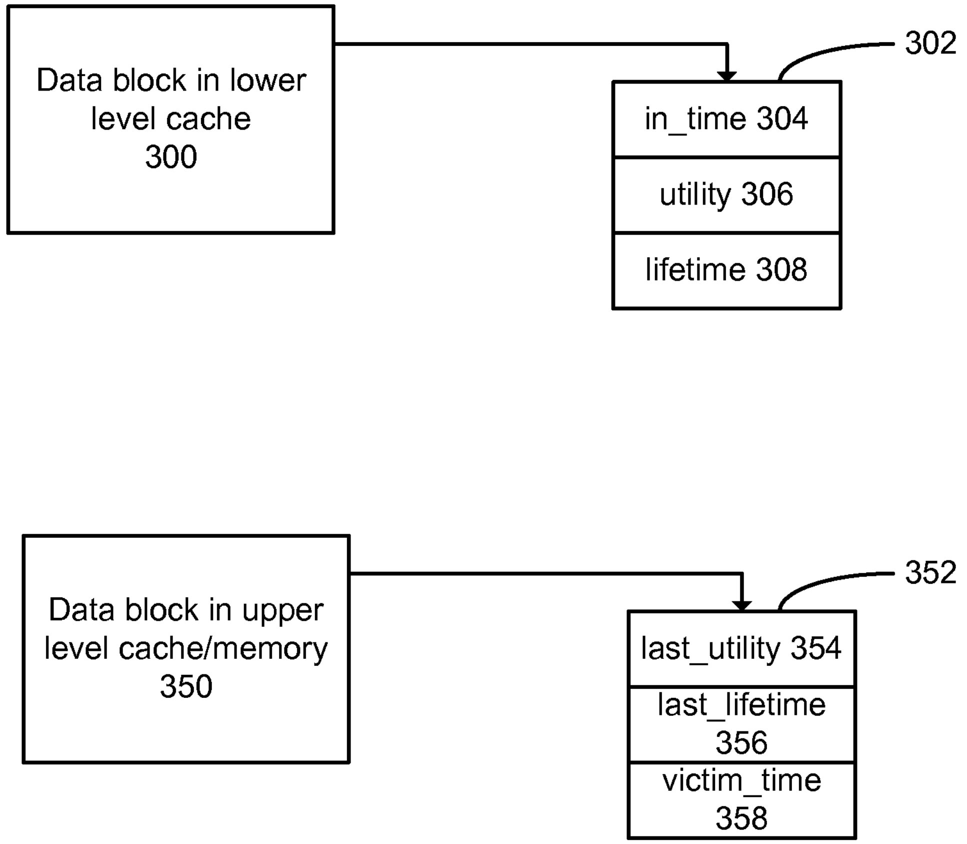
FIG. 3 is a block diagram of data related to a cache block to be stored according to an embodiment of the invention.

FIG. 3 is a block diagram of data related to a cache block to be stored according to an embodiment of the invention. Data 302 is shown to be related to data in lower level cache block 300. The described data may be stored as metadata related to the cache block, data related to cache block stored in a look-up table, or any other equivalent means for storing data describing a plurality of cache blocks. Said data is used for cache block replacement policies according to embodiments of the invention.

Lower level cache block data 302 includes "in_time" value 304, which describes a time a block was allocated in the cache. This data may describe actual time in seconds, cycles, etc. In other embodiments, a miss counter may provide a notion of time. For example, in_time value 304 may describe the time to encounter as many misses as the capacity of the cache in terms of number of cache-blocks (as described in FIG. 4).

Lower level cache block data 302 further includes "utility" value 306, which describes the current utility category assigned to the cache block, and "lifetime" value 308, which describes the current lifetime category assigned to the cache block. Said values may be used in any combination for prioritization in victimization—e.g., a cache replacement policy may use utility values only, lifetime values only, or both in any combination.

Data 352 is shown to be related to the upper level cache (or memory) block 350. The described data may be stored as metadata related to the upper level cache (or memory) block, data related to upper level cache (or memory) block stored in a look-up table, or any other equivalent means for storing data describing a plurality of cache blocks. Said data is used for the categorization of lower level cache blocks according to embodiments of the invention.

Data 352 is shown to include "last utility" value 354, which describes the previous utility category or value of the block, and "last lifetime" value 356, which describes the previous lifetime category or value of the block.

Data 352 further includes "victim time" value 358, which describes the time the block was victimized from the cache and may be described in the same units or terms as "in_time" value 304 of lower level cache block data 302. Said "victim_time" value may be used to calculate the above-described "victimization-to-use" time, which is further used to estimate the new utility and lifetime values—i.e., values 306 and 308 of lower level cache block data 302 respectively.

With regards to the utility and lifetime information in the cache, while it is possible to have separate lifetime and utility fields for each cache block, other embodiments may maintain all blocks belonging to a specific utility or lifetime category in a list. Then, during a victim search, it may be sufficient to only check the head block of a list. If the set of blocks to be searched is small enough, a brute force search may be a more efficient means to determine a victim.

Figure 4:
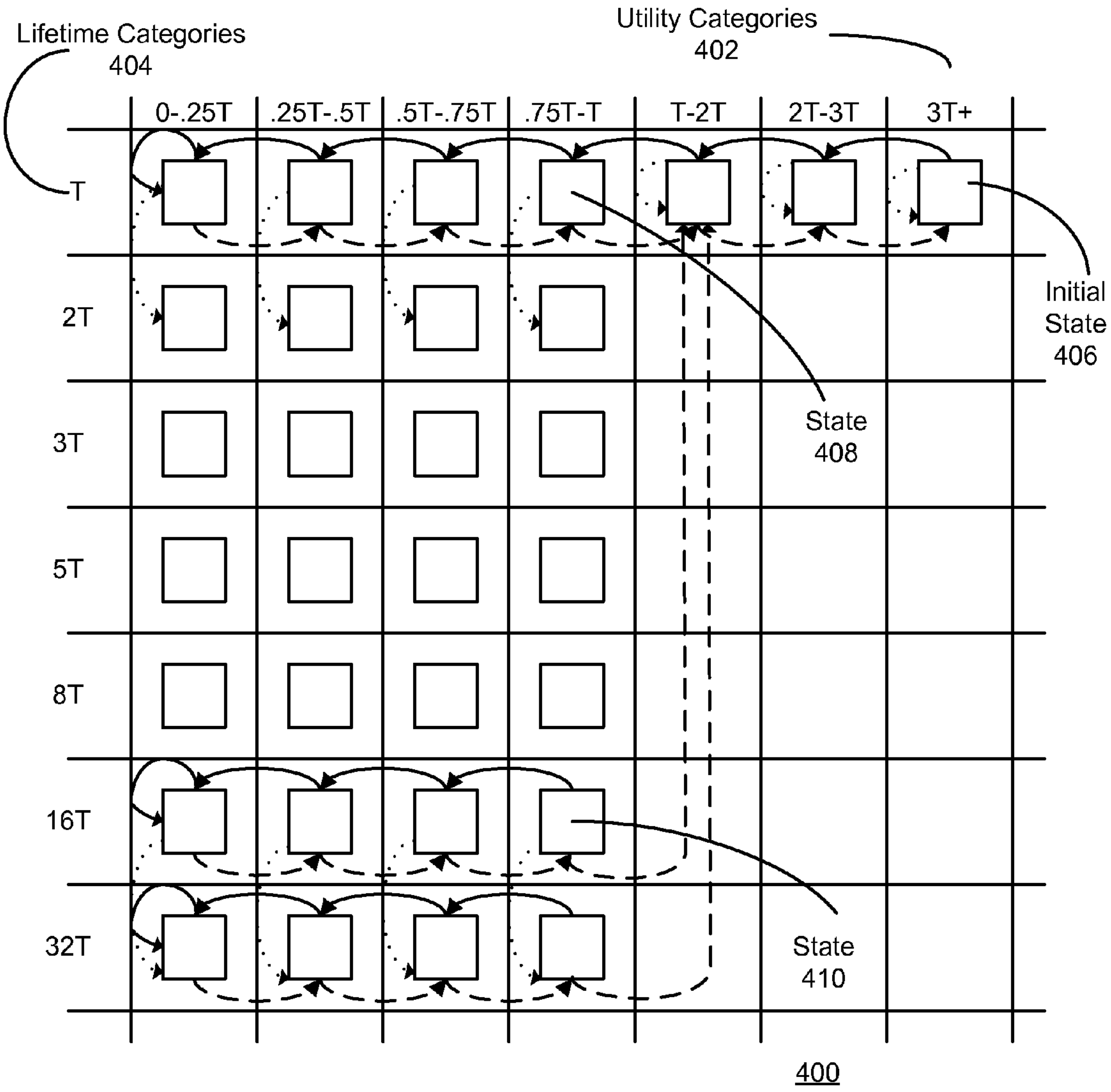
FIG. 4 is a diagram of a cache block utility and lifetime categorization process according to an embodiment of the invention.

FIG. 4 is a diagram of a cache block utility and lifetime categorization process according to an embodiment of the invention. Table 400 illustrates an example state transition diagram that may be used to assign, at the time a block is allocated into the cache, its new utility and lifetime category based on its previous category and most recent victimization-to-use time.

In this embodiment, said utility and lifetime values are shown to be a finite number of categories—utility categories shown in X-axis 402 and lifetime categories in Y-axis 404. In the figure, all (utility, lifetime) categories are laid down on a two dimensional space. Each arrow shows a transition from a previous (utility, lifetime) category to a new (utility, lifetime) category depending on the last time. Value 'T' describes as many misses as the capacity of the cache in terms of number of cache-blocks (e.g., for a cache comprising 10,000 blocks, value T represents 10,000 cache misses).

In this embodiment, the first time a block is brought into the cache, it is categorized to be of the lowest utility and with shortest lifetime, shown as initial state 406, as there is no previous history of values for the block. In the subsequent instances, the utility and lifetime category of the block may change based on its previous categories and its most recent "victimization to use" time.

Some (but not all) examples of determining the utility and lifetime category of the block based on its previous categories and its most recent "victimization to use" time are shown in FIG. 4. In this diagram, state transitions occurring as a result of the current "victim-to-use" time being less than its previous utilization category are shown as solid directional lines moving right-to-left; state transitions occurring as a result of the current "victim-to-use" time being greater than its previous utilization category are shown as dashed directional lines moving left-to-right; and state transitions occurring as a result of the current "victim-to-use" time being the same as its previous utilization category are shown as dotted directional lines moving downward.

For state 408, if the current "victim to use" time is determined to be less than 0.75T (e.g., less than 7,500 cache misses), then the utilization category is shown to transition to category "0.5T–0.75T;" if the "victim to use" time is determined to be greater than T (e.g., greater than 10,000 cache misses), then the utilization category is shown to transition to category "T–2T;" and if the "victim to use" time is determined to be within the same category, then the lifetime category is shown to transition to 2T (i.e., a lifetime of 20,000 cache misses).

In this embodiment, state transitions may cross multiple categories, depending on the block's previous categories. For state 410, if the current "victim to use" time is determined to be less than 0.75T, then the utilization category is shown to transition to category "0.5T–0.75T;" and if the "victim to use" time is determined to be within the same category, then the lifetime category is shown to transition to 32T (i.e., a lifetime of 320,000 cache misses); however, for this state, if the "victim to use" time is determined to be greater than T, then the utilization category is shown to transition to category "T–2T" and the lifetime category for the block is shown to transition to category T.

In this embodiment, when the system cache controller is searching for a victim, the replacement policy may dictate that the controller is to first try to evict a stale block—i.e., a block whose current stay in the cache exceeds its lifetime category. It searches for a block following a particular category prioritization policy.

In case there is no stale block, the replacement policy may dictate that the controller pick a low utility block again searching categories in a specific order. While looking for a stale block, the replacement policy tries to pick a block with shortest lifetime expectation, in this example, lifetime expectation category T. Among multiple such blocks, it picks the one with the lowest utility.

In one embodiment of the invention, all lifetime categories 404 are exhausted (i.e., categories T to 32T) before looking to utility categories 402. If there is no stale block found in said lifetime categories, then it tries to pick a block with the lowest utility (i.e., categories "3T+" to "0–0.25T"). Among multiple such blocks that may exist, the replacement policy may dictate that the controller select the block with the shortest lifetime. In some embodiments, other conditions may also be added to the victim selection criteria, for example, the victim block must have been in the cache for some minimum amount of time. Moreover, when searching for a victim block, some embodiments of the invention search only a subset of the categories at a time, instead of all categories, with the hope of reducing the algorithmic complexity. For example, only one category may be checked for staleness at each victim search process. Furthermore, because the victim selection process does not need any hit information, it may be removed from the critical path.

Figure 5:
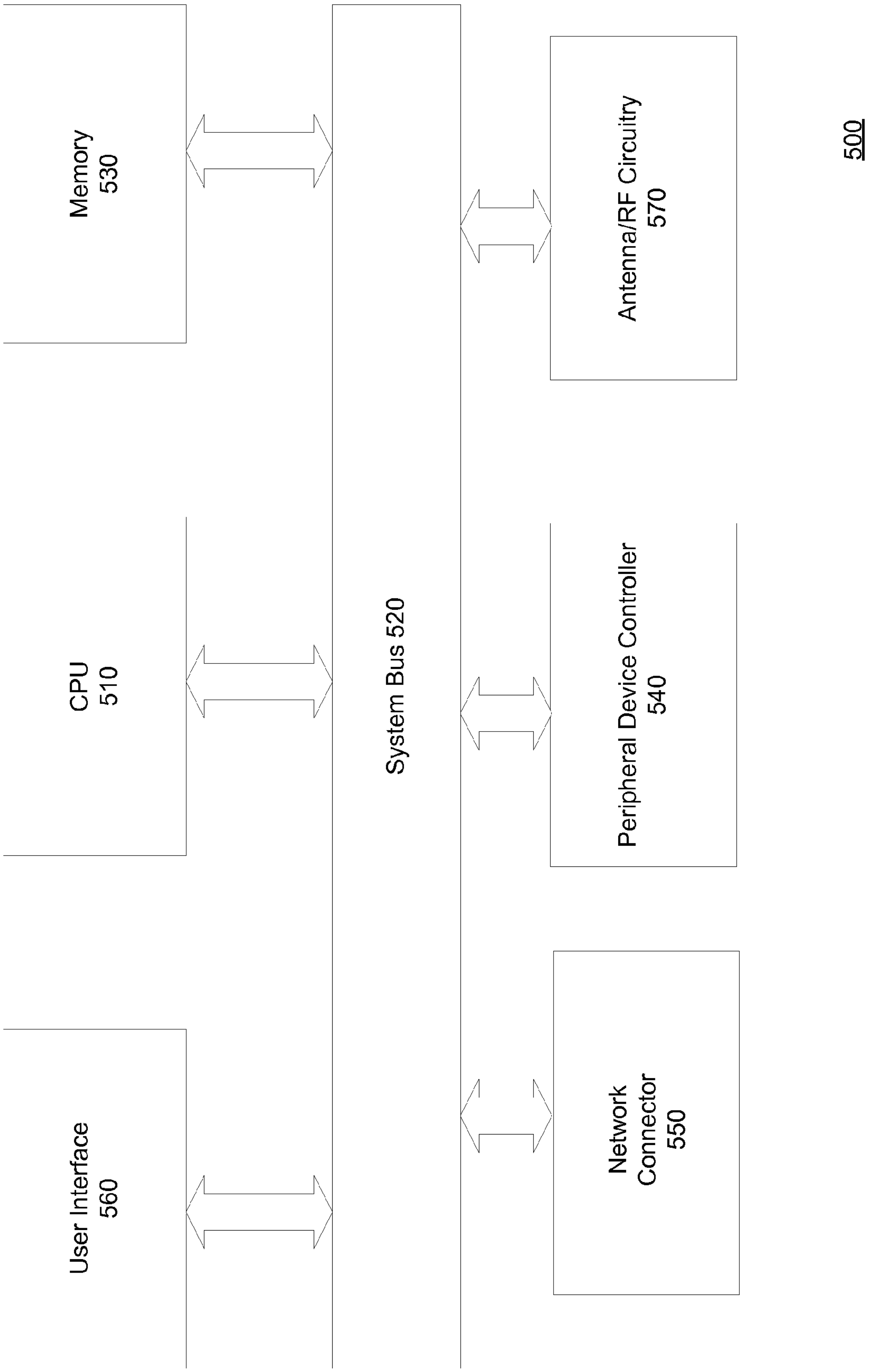
FIG. 5 is block diagram of a system to utilize an embodiment of the invention.

FIG. 5 is a block diagram of a system to utilize an embodiment of the invention. System 500 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 500 may include processor 510 to exchange data, via system bus 520, with user interface 560, system memory 530, peripheral device controller 540 and network connector 550. Said processor may utilize cache memory, and the respective processor may utilize cache replacement policies according to any of the embodiments described above. Replacement policies according to embodiments of the invention may be employed in fully or set associative caches. In set associative caches, the algorithm is applied to a set of cache blocks. The (utility, lifetime) categories may be maintained per set. The hardware implementation may vary depending on the specific configuration.

System 500 may further include antenna and RF circuitry 570 to send and receive signals to be processed by the various elements of system 500. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 500 may include multiple physical antennas.

System 500 may further include hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

While shown to be separate from network connector 550, it is to be understood that in other embodiments, antenna and RF circuitry 570 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol. In other embodiments, RF circuitry 570 may comprise cellular network connectivity logic or modules provided by wireless carriers, such as provided via GSM (global system for mobile communications) or variations or derivatives, CDMA (code division multiple access) or variations or derivatives, TDM (time division multiplexing) or variations or derivatives, or other cellular service standards.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 6A:
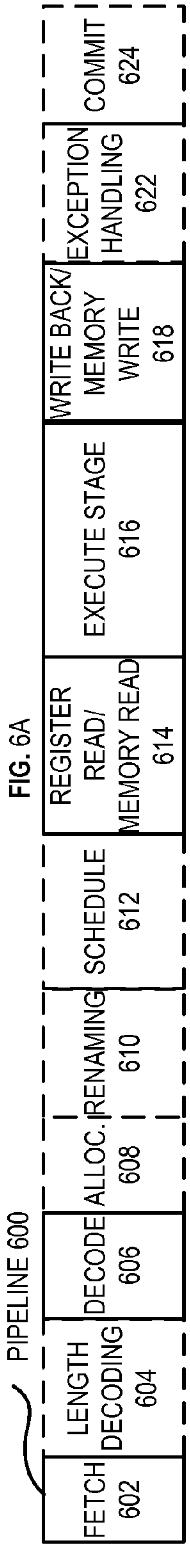
FIG. 6A is a block diagram illustrating both an exemplary in-order pipeline and an exemplary register renaming, out-of-order issue/execution pipeline according to embodiments of the invention.
Figure 6B:
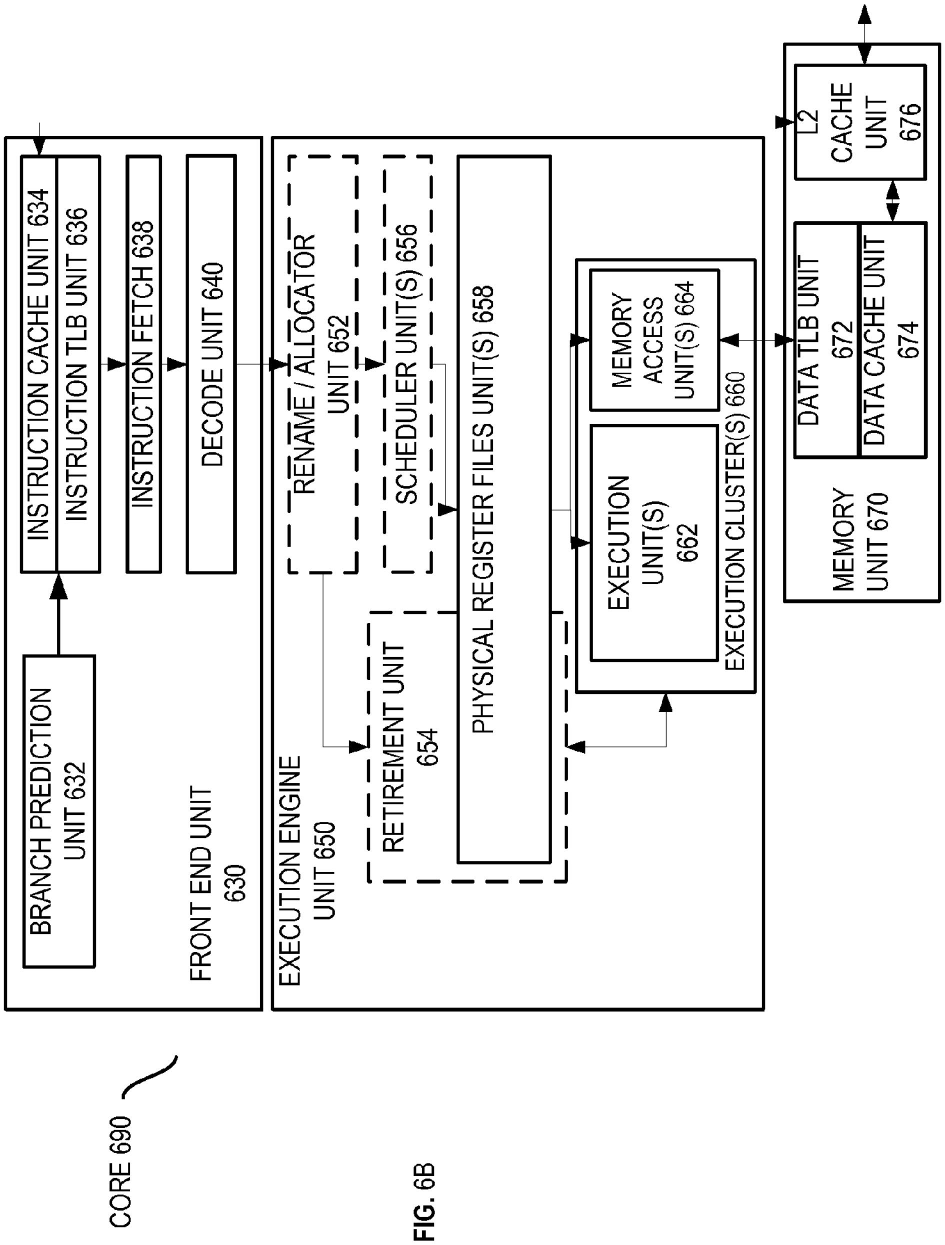
FIG. 6B is a block diagram illustrating both an exemplary embodiment of an in-order architecture core and an exemplary register renaming, out-of-order issue/execution architecture core to be included in a processor according to embodiments of the invention.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7B:
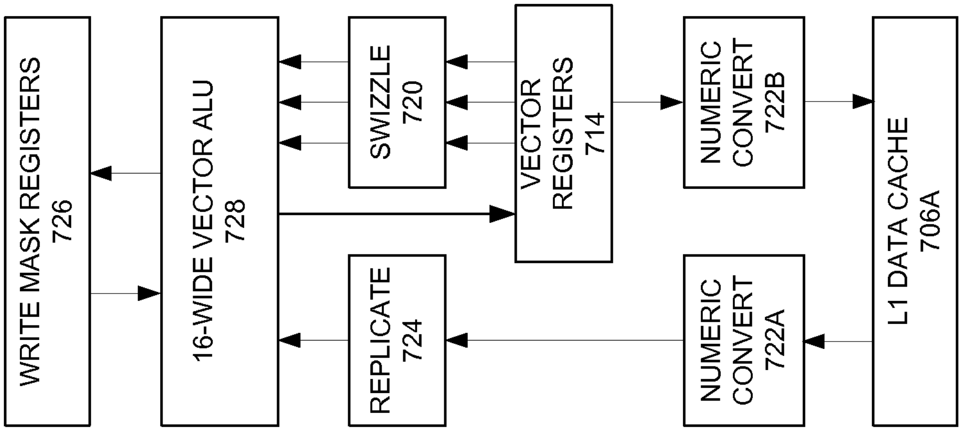
FIGS. 7A-B illustrate a block diagram of a more specific exemplary in-order core architecture, which core would be one of several logic blocks (including other cores of the same type and/or different types) in a chip.
Figure 7A:
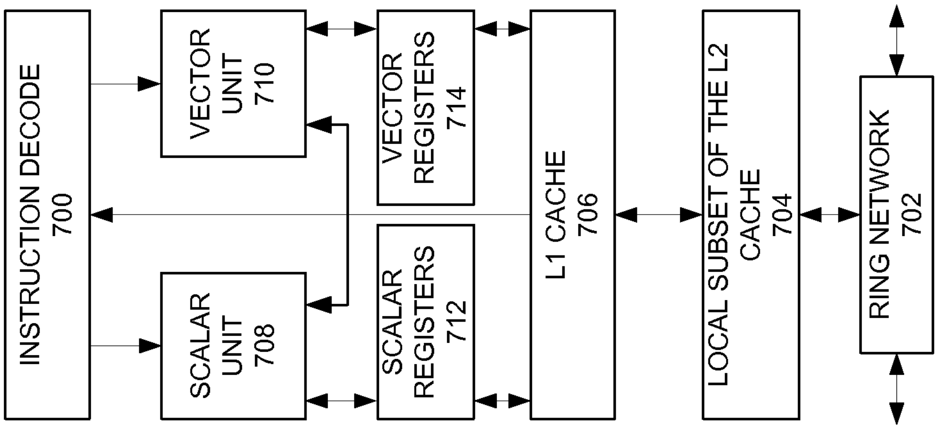

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Figure 8:
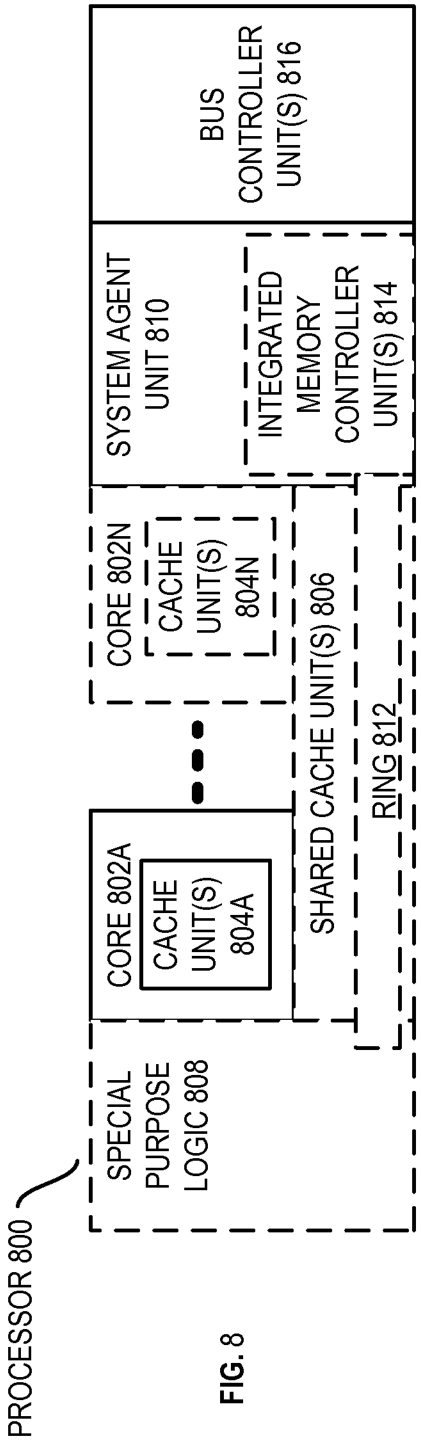
FIG. 8 is a block diagram of a processor 800 that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein arc generally suitable.

Figure 9:
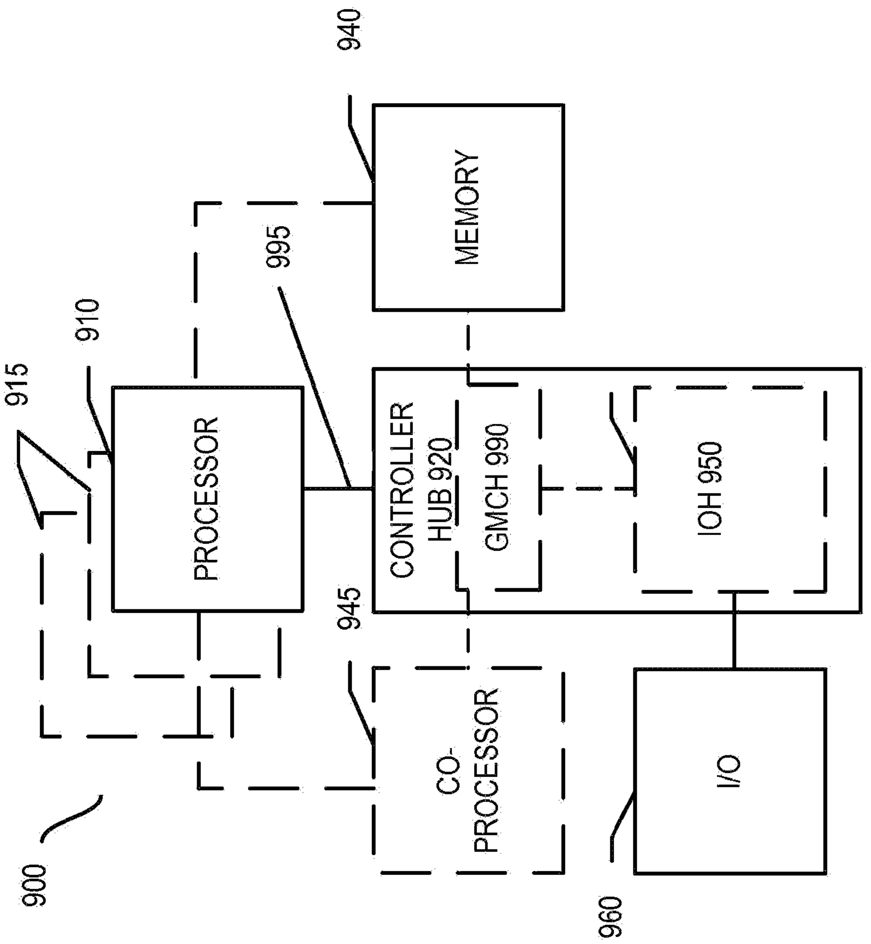
FIG. 9 is a block diagram of an exemplary computer architecture according to an embodiment of the invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
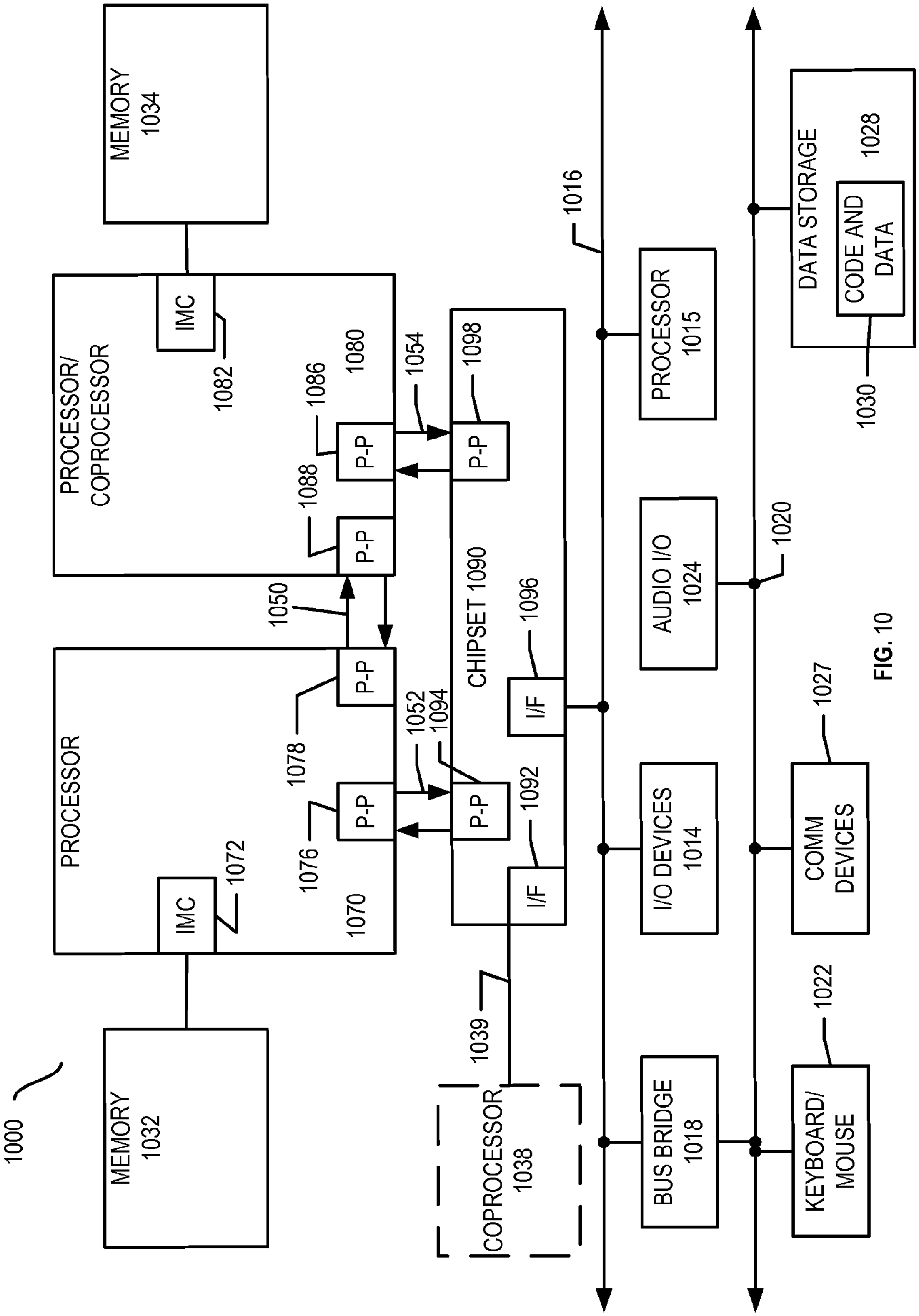
FIG. 10 is a block diagram of an exemplary computer architecture according to an embodiment of the invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
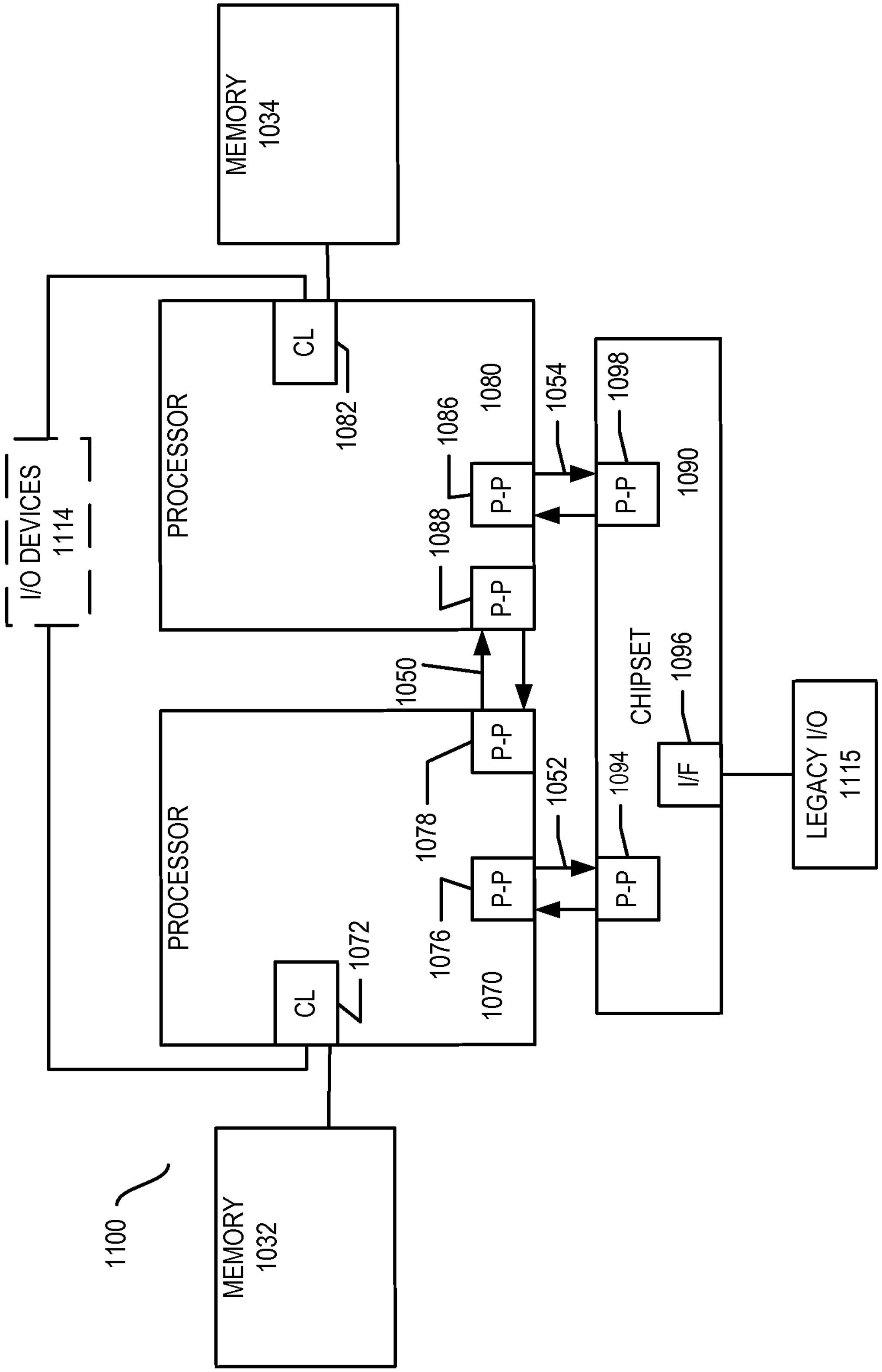
FIG. 11 is a block diagram of an exemplary computer architecture according to an embodiment of the invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
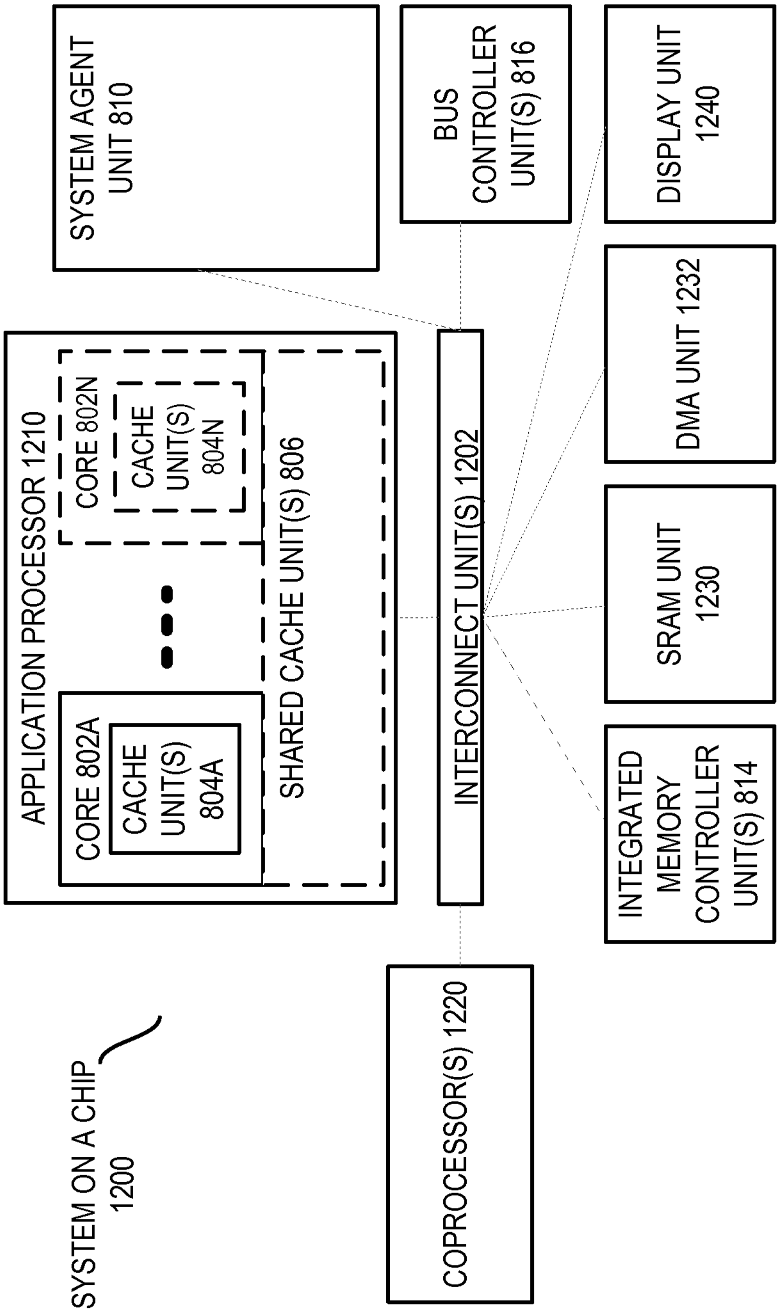
FIG. 12 is a block diagram of an exemplary computer architecture according to an embodiment of the invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
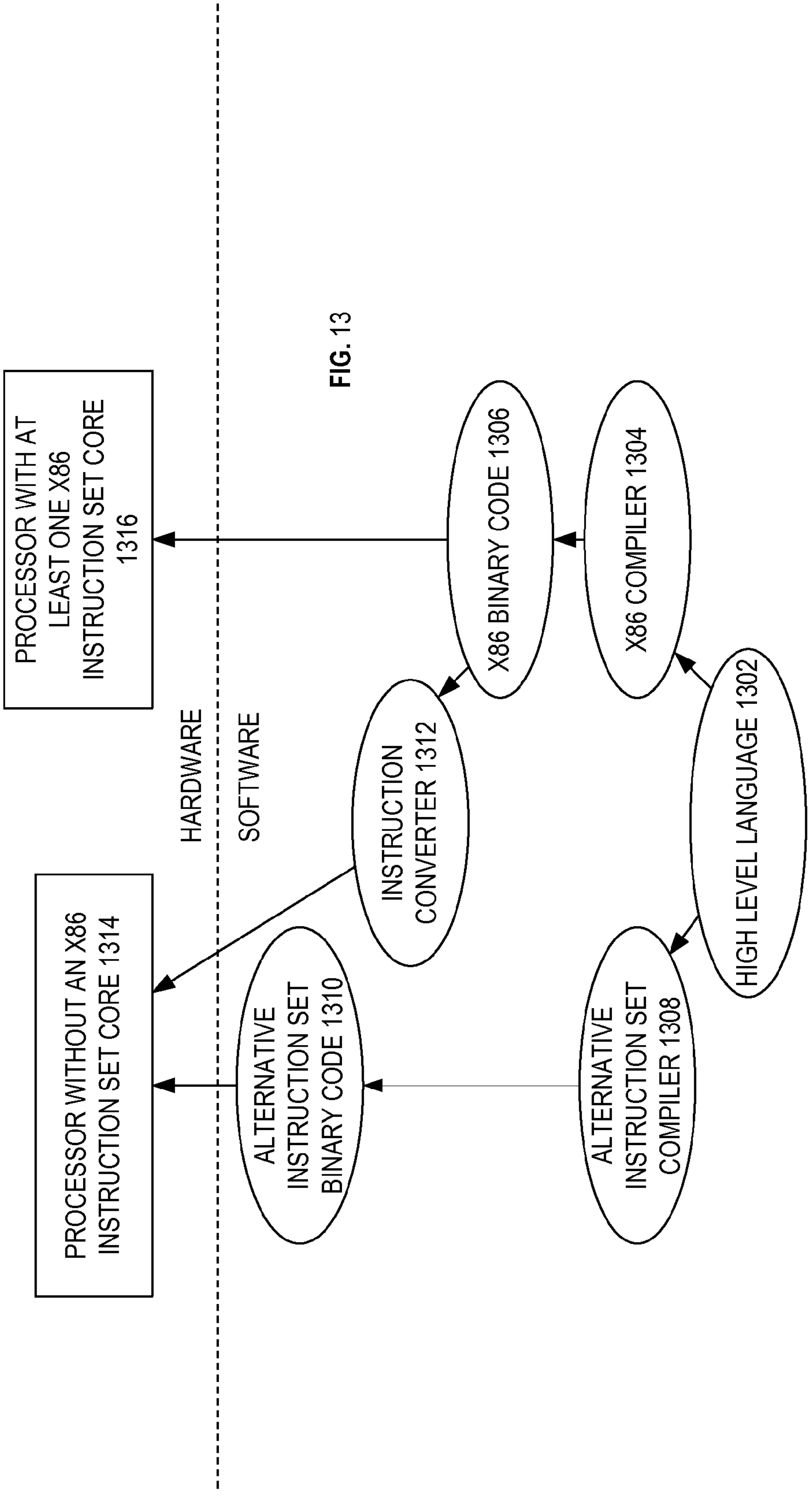
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A method comprising:

determining, for a plurality of cache blocks in a cache memory, an estimated utility and lifetime of the contents of each cache block, the utility of a cache block to indicate a likelihood of use its contents, the lifetime of a cache block to indicate a duration of use of its contents;

receiving a cache access request resulting in a cache miss; and selecting one of the cache blocks to be replaced based, at least in part, on one of the estimated utility or estimated lifetime of the cache block.

2. The method of claim 1, wherein selecting one of the cache blocks to be replaced comprises selecting a cache block with a shortest estimated lifetime.

3. The method of claim 2, further comprising:

determining the contents of the cache block selected to be replaced have been included in the cache memory past a minimum amount of time.

4. The method of claim 1, wherein selecting one of the cache blocks to be replaced comprises selecting a cache block with a shortest estimated utility.

5. The method of claim 1, further comprising:

storing candidate replacement data identifying one or more cache blocks having an estimated lifetime below a first threshold value and an estimated utility below a second threshold value; and accessing the candidate replacement data for selecting one of the cache blocks to be replaced based.

6. The method of claim 1, wherein the plurality of cache memory blocks comprises a subset of the cache blocks of the cache memory.

7. The method of claim 1, further comprising:

storing data indicating the estimated utility and lifetime of the plurality of cache blocks in a lower level cache memory.

8. An apparatus comprising:

one or more processor cores;

a cache memory accessible via the processor core(s); and a cache controller to determine, for a plurality of cache blocks in the cache memory, an estimated utility and lifetime of the contents of each cache block, the utility of a cache block to indicate a likelihood of use its contents, the lifetime of a cache block to indicate a duration of use of its contents;

receive a cache access request resulting in a cache miss; and select one of the cache blocks to be replaced based, at least in part, on one of the estimated utility or estimated lifetime of the cache block.

9. The apparatus of claim 8, wherein selecting one of the cache blocks to be replaced comprises selecting a cache block with a shortest estimated lifetime.

10. The apparatus of claim 9, the cache controller to further:

determine the contents of the cache block selected to be replaced have been included in the cache memory past a minimum amount of time.

11. The apparatus of claim 8, wherein selecting one of the cache blocks to be replaced comprises selecting a cache block with a shortest estimated utility.

12. The apparatus of claim 8, the cache controller to further:

store candidate replacement data identifying one or more cache blocks having an estimated lifetime below a first threshold value and an estimated utility below a second threshold value; and access the candidate replacement data for selecting one of the cache blocks to be replaced based.

13. The apparatus of claim 8, wherein the plurality of cache memory blocks comprises a subset of the cache blocks of the cache memory.

14. The apparatus of claim 8, the cache controller to further:

store data indicating the estimated utility and lifetime of the plurality of cache blocks in a lower level cache memory.

15. A system comprising:

a processor;

a memory; and a cache controller included in the processor to determine, for a plurality of cache blocks in a cache memory included in the processor and to store contents from the memory, an estimated utility and lifetime of the contents of each cache block, the utility of a cache block to indicate a likelihood of use its contents, the lifetime of a cache block to indicate a duration of use of its contents;

receive a cache access request resulting in a cache miss; and select one of the cache blocks to be replaced based, at least in part, on one of the estimated utility or estimated lifetime of the cache block.

16. The system of claim 15, wherein selecting one of the cache blocks to be replaced comprises selecting a cache block with a shortest estimated lifetime.

17. The system of claim 16, the cache controller to further:

determine the contents of the cache block selected to be replaced have been included in the cache memory past a minimum amount of time.

18. The system of claim 15, wherein selecting one of the cache blocks to be replaced comprises selecting a cache block with a shortest estimated utility.

19. The system of claim 15, the cache controller to further:

store candidate replacement data identifying one or more cache blocks having an estimated lifetime below a first threshold value and an estimated utility below a second threshold value; and access the candidate replacement data for selecting one of the cache blocks to be replaced based.

20. The system of claim 15, wherein the plurality of cache memory blocks comprises a subset of the cache blocks of the cache memory.

21. The system of claim 15, the cache controller to further:

store data indicating the estimated utility and lifetime of the plurality of cache blocks in a lower level cache memory.

* * * * *